United States Patent [19]
Schmidt

[11] Patent Number: 4,505,761
[45] Date of Patent: Mar. 19, 1985

[54] METHOD AND APPARATUS FOR QUENCHING A TORCH-CUT WORK-PIECE

[75] Inventor: Paul W. Schmidt, Portland, Oreg.

[73] Assignee: ESCO Corporation, Portland, Oreg.

[21] Appl. No.: 608,375

[22] Filed: May 9, 1984

[51] Int. Cl.³ .............................................. B23K 7/02
[52] U.S. Cl. .................................... 148/9 R; 266/48
[58] Field of Search .............. 148/9 R, 9 C; 266/48, 266/49

[56] References Cited

U.S. PATENT DOCUMENTS

| | | | |
|---|---|---|---|
| 2,208,121 | 9/1940 | Davis ................................... | 148/9 R |
| 2,227,476 | 1/1941 | Williams et al. ..................... | 148/9 R |
| 2,464,351 | 3/1949 | Shorter ................................. | 148/9 R |

Primary Examiner—W. Stallard
Attorney, Agent, or Firm—Tilton, Fallon, Lungmus & Chestnut

[57] ABSTRACT

A method and apparatus for quenching a torch-cut work-piece wherein a spray curtain is mounted on a bearing with approximately 30° of the circular spray eliminated immediately behind the direction of travel. The spray direction is controlled by a friction operated directional spray arm carrying an idler wheel.

14 Claims, 3 Drawing Figures

METHOD AND APPARATUS FOR QUENCHING A TORCH-CUT WORK-PIECE

BACKGROUND AND SUMMARY OF INVENTION

This invention relates to a method and apparatus for quenching a torch-cut work-piece and, more particularly, to a novelly developed spray curtain for use in combination with a torch traveling with respect to the work-piece being cut.

For many years the art has utilized circular or conical shaped spray curtains in combination with cutting torches—see U.S. Pat. Nos. 2,227,476; 2,464,351; 3,815,833; 3,934,818; 4,168,055 and 4,358,091. In practice, this has resulted in a substantial amount of material to be scrapped or time spent in reclaiming cracks in formed material due to the water quench and tempering effect of the spray curtain.

According to the invention, the water curtain is controlled so that no spray is directed to the fine cut edge and hence the tempering problem has been solved—and the percentage of forming cracks has been reduced. More particularly, the invention involves moving a cutting torch relative to a work piece to be cut and directing an enveloping curtain of water about the torch for impingement upon the work-piece except against the portion of the work-piece just cut, viz., in preferred form, the trailing 30°.

Other objects and advantages of the invention may be seen in the details of construction and operation set down in the ensuing specification.

The invention is described in conjunction with the accompanying drawing, in which—

DETAILED DESCRIPTION

Figure 1:
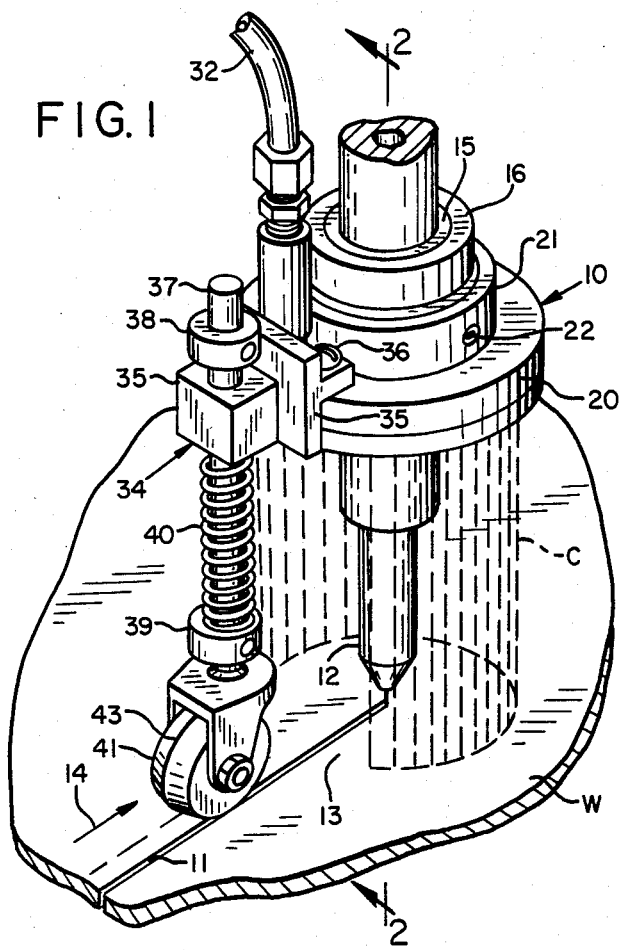
FIG. 1 is a fragmentary perspective view of an embodiment of the invention in operation.

In the embodiment illustrated and with reference first to FIG. 1, the numeral 10 designates generally the inventive apparatus which is seen in the process of developing a cut 11 in a work-piece W and wherein the water curtain C partially envelopes the torch head 12. The interrupted trailing portion of the curtain 13 is advantageously of the order of 30° as can be appreciated from a consideration of FIG. 3 as well. The fact that the interrupted portion 13 trails the torch 12 can be appreciated also from noting the direction of travel as indicated by the arrow 14 (see both FIGS. 1 and 3).

Figure 2:
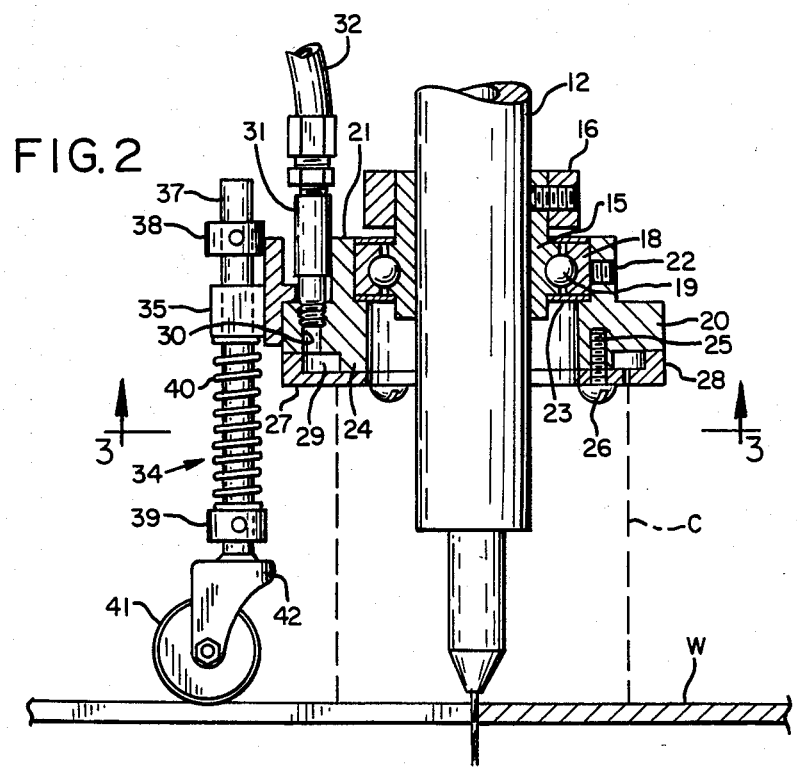
FIG. 2 is a sectional view taken along the sight line 2—2 of FIG. 1, viz., a vertical sectional view.

The frame or structure responsible for developing the interrupted curtain can be best appreciated from FIG. 2 where the numeral 15 designates a collar which is clamped to the torch 12 by means of a clamping ring 16 equipped with a set screw 17. The collar 15 provides part of an annular race along with collar 18 for ball bearings 19. Thus, the outer collar 18 and the apparatus associated with it—to be described hereinafter—can swivel freely around the axis of the torch head 12.

Secured to the outer collar 18 in fixed relation therewith is a circular bracket 20 which has an upstanding shoulder 21. The upstanding, annular shoulder 21 is also equipped with a set screw as at 22 for fixedly securing the bracket 20 to the outer collar 18. Seals for the ball bearing race are provided above and below, the lower annular seal being designated 23 in FIG. 2.

The lower face of the bracket 20 is equipped with a depending flange as at 24 which is equipped with a plurality of threaded openings as at 25—for the receipt of cap screws 26 for securing a base plate 27 to the bracket 20. The base plate 27 is equipped with an upstanding flange as at 28 and defines with the depending flange 24 and annular chamber 29 for the distribution of water or other quenching fluid.

It will be appreciated that the base plate 27 can be readily removed and a different base plate substituted so as to develop a different water spray pattern.

For supplying water to the annular chamber 29, I provide a water inlet 30 in the bracket 20. Secured to this is a swivel conduit 31 which eliminates any entanglement of the water supply line 32 connected thereto.

Figure 3:
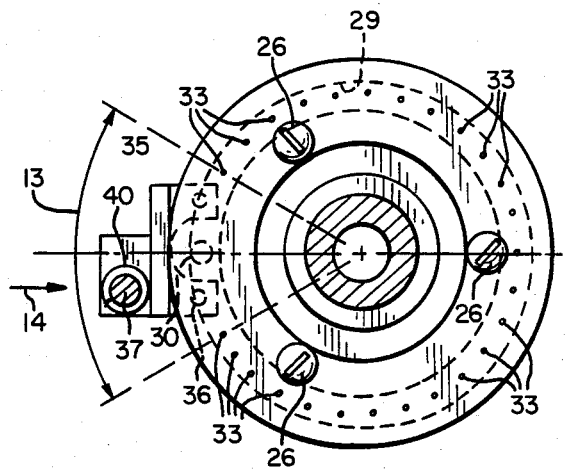
FIG. 3 is a sectional view taken along the sight line 3—3 applied to FIG. 2, viz., a horizontal sectional view.

It will be appreciated that the face plate 27 is equipped with a plurality of arcuately disposed water outlet ports as at 33—see particularly FIG. 3. These can assume any particular pattern as desired so long as the arcuate or perimetric extent is interrupted as at 13. In the illustration given, the interruption or lack of ports 33 is provided in an area flanking the inlet port 30. Thus, water entering the inlet port 30 is diverted left and right to supply the various ports 33.

Radially aligned with the blanked portion 13—radially in the sense of the axis of the cutting torch 12—is the idler wheel unit generally designated 34. The unit 34 includes a flanged block 35 which is bolted as at 36 (see FIG. 1) to the bracket 20. The block 35 is equipped with a vertical bore in which a wheel post 37 is slidably installed. The post 37, in turn, is equipped with set screw-fixed collars as at 38 and 39 which serve as stops for the spring 40. More particularly, the upper stop 38 limits the downward travel of the post 37—and hence the idler wheel 41—by coming into engagement with the upper surface of the block 35.

On the other hand, the stop 39 can be positioned to adjust the tension in the coiled spring 40 which allows the wheel 41 to roll over and foreign materials that could be lying on the surface of the plate and to roll easily off and on the edge of the plate or work-piece being cut.

As illustrated, the wheel 41 is carried in a bracket assembly 42 which is affixed to the lower end of the post 37.

Advantageous results have been attained through the use of an idler wheel made of brass which has a 7° pitch to center as at 43 (see FIG. 1)—thereby providing longer wear life.

OPERATION

In operation, the inventive apparatus can be adjusted to any cutting torch regardless of manufacture. The single row ball bearing unit including the inner and outer collars 15, 18 and balls 19 is clamped to the torch by means of a set screw 17 carried in the upper collar 16.

Also clamped to the ball bearing unit 15, 18 is a bracket 20 which in combination with the base plate 27 defines an annular chamber 29 for the distribution of quenching fluid introduced through the conduit 32.

The base plate 27 is apertured throughout a substantial protion of the arc around the torch 12 to provide the ports 33. The portion not apertured, viz., the angle 13, is aligned with the idler wheel unit 34 which is equipped with a spring 40 to permit the idler wheel 41 to ride over uneven surfaces.

With the inventive arrangement, the torch is movable through 360° but will allow no spray (or quenching) regardless of the shape being cut.

The weight of the torch and spray apparatus serves to compress the spring 40 somewhat and thereby sets the height of the spray pattern. By changing the position of the lower stop 39, this height can be adjusted further and protection against the spring 40 seeking to expell the post 37 and idler wheel unit from the block 35 is provided by the upper stop 38. Advantageously, the various parts of the apparatus clamped to the torch are constructed of brass and stainless steel to eliminate any corrosion or metal splatter build-up.

With the simple yet rugged mounting of the bottom face-plate 27, the plate port spacing and arrangment can be changed easily with the removal of the three screws 26 for different spray patterns.

Through the use of the inventive interrupted water spray curtain, one can control the spray area and eliminate any quenching of hot metal. This eliminates the creation of hardened areas that could crack during a forming process and thereafter be consigned to scrap. Also, from the operational standpoint, the operator does not have to shut off the water during some cuts which results in decreased productivity.

In the operation of the invention, it will be appreciated that the idler wheel assembly not only supports the torch head 12 but also constitutes a friction means for controlling the spray direction. As the torch head moves in different directions incident to a cut, the swivel mounting of the idler wheel assembly necessarily brings the curtain gap 13 into position immediately rearward of the cut, i.e., the spray is eliminated 180° from the direction of travel.

While in the foregoing specification a detailed description of an embodiment of the invention has been set down for the purpose of illustration, many variations in the details hereingiven may be made by those skilled in the art without departing from the spirit and scope of the invention.

I claim:

1. A method for quenching a torch-cut work-piece comprising moving a cutting torch relative to a work-piece to be cut and directing an enveloping curtain of water about said torch for impingement upon said work-piece except against the portion of the work-piece just cut.

2. The method of claim 1 in which said curtain is generally circular in nature when impinging upon said work-piece, the said excepted portion being about 30° in arcuate extent.

3. The method of claim 1 in which said excepted portion is developed by an interrupted distribution annulus which is rotatably mounted relative to said cutting torch, and rotating said annulus by frictional engagement with said work-piece.

4. A method of spray application to a workpiece being torch cut comprising traveling an interrupted perimetric spray curtain with a torch over the surface of said work-piece, and swiveling said curtain upon change of direction of said torch in making said cut to maintain the interruption of said curtain approximately 180° from the direction of travel of said torch.

5. The method of claim 4 in which said swiveling is accomplished by frictionally engaging said work-piece surface.

6. The method of claim 5 in which said frictional engagement is accomplished by a spring-loaded idler wheel assembly, and adjusting the spring loading to regulate the height of said spray curtain.

7. The method of claim 4 in which said perimetric curtain is generally circular when impinging upon a planar surface, said interruption being of the order of about 30°.

8. Apparatus for spray application to a work-piece being torch cut comprising a bracket adapted to be rotatably mounted to said torch, said bracket having means for developing an interrupted perimetric curtain of spray about said torch, and idler wheel assembly means mounted on said bracket in alignment with said interruption for frictionally engaging said work-piece and maintaining said interrupted portion rearward of the direction of travel of said torch.

9. The apparatus of claim 8 in which said developing means includes an open, annular chamber in said bracket and face place means removably secured to said bracket to close said chamber, said face plate means being apertured perimetrically except for the portion providing said interruption.

10. The structure of claim 9 in which liquid supply means is connected to said bracket annular chamber in radial alignment with said idler wheel assembly means.

11. The apparatus of claim 8 in which said idler wheel assembly means includes spring-loaded post means for regulating the height of said curtain and for accommodating said apparatus to irregularities in travel on said work-piece.

12. Apparatus for the application of a liquid spray curtain to the surface of a work-piece being torch cut comprising ball-bearing race means adapted to be mounted on said torch for travel therewith, said race means being equipped with annulus means for directing a generally arcuate curtain of spray about said torch means except for a minor arc, and idler wheel assembly means operably associated with said race means for frictional engagement with said work-piece to rotate said race means and position said minor arc approximately 180° from the direction of travel of said torch.

13. The apparatus of claim 12 in which said race means includes an inner collar adapted to be fixed to said torch and having an exteriorly facing portion in engagement with the balls of said race means, a bracket disposed outwardly of said collar and supported by said balls whereby said bracket is adapted to swivel relative to said collar, said bracket being equipped with an annular groove adapted to face downwardly when said balls are disposed in a horizontal plane, an apertured face plate covering said groove with said apertures being patterned to develop said minor arc.

14. The structure of claim 13 in which said idler wheel assembly means is fixed to said bracket in alignment with said minor arc and includes a post vertically extending when said balls are disposed in a horizontal plane, said post being slidable vertically relative to said bracket between adjustable stops.

* * * * *